United States Patent
Rose et al.

(10) Patent No.: US 6,396,840 B1
(45) Date of Patent: *May 28, 2002

(54) METHOD, INTERFACE AND SYSTEM FOR CONNECTING COMMUNICATION TRAFFIC ACROSS AN INTERMEDIATE NETWORK

(75) Inventors: Desne Jean Rose, St Albans; Roy Harold Mauger, Radlett, both of (GB)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/089,796

(22) Filed: Jun. 3, 1998

(30) Foreign Application Priority Data

Jun. 6, 1997 (GB) .............................................. 9711788

(51) Int. Cl.7 .................................................. H04J 3/02
(52) U.S. Cl. ....................................................... 370/401
(58) Field of Search ................................ 370/351, 352, 370/401, 400, 389, 399, 397, 396, 395, 465, 466, 468, 335, 537, 503, 229, 412, 516, 460, 252–255, 353, 360, 364, 394, 406, 409, 467, 469, 471, 474–476; 379/14, 16, 95.15, 93.14, 93.07, 93.05, 93.31, 219, 220, 225, 232, 240, 242, 229, 230, 231

(56) References Cited

U.S. PATENT DOCUMENTS

| | | | | | |
|---|---|---|---|---|---|
| 5,592,477 A | * | 1/1997 | Farris et al. | ................ | 370/396 |
| 5,914,934 A | * | 6/1999 | Rathnavelu | ................ | 370/229 |
| 5,923,659 A | * | 7/1999 | Curry et al. | ................ | 370/401 |

* cited by examiner

*Primary Examiner*—Dang Ton
(74) *Attorney, Agent, or Firm*—Lee, Mann, Smith, McWilliams Sweeney & Ohlson

(57) ABSTRACT

Interconnection of a multimedia terminal (110) of a narrowband, LAN-type network (10) to an exchange (118) and thence to an end-point (119) is orchestrated through an intermediate network (142), as shown in FIG. 5. A route (115) to the exchange (118) is initially established by a call handler (116) in responsive to a called party number of the end-point, before a connection supervisor (120), coupled to the call handler (116), sets up a control channel across the intermediate network (142). The control channel supports the communication of control messages between the multimedia terminal (110) and the end-point (119), which control messages are intercepted and interpreted by the connection supervisor (120). The connection supervisor (120) then establishes media paths through the intermediate network (142) dependent upon types of control message sent across the control channel, which media paths are used to transfer traffic components across the intermediate network.

24 Claims, 6 Drawing Sheets

METHOD, INTERFACE AND SYSTEM FOR CONNECTING COMMUNICATION TRAFFIC ACROSS AN INTERMEDIATE NETWORK

This application claims priority from United Kingdom Application No.: 97117881 filed Jun. 6, 1997 in the name of Northern Telecom Limited.

BACKGROUND OF THE INVENTION

This invention relates, generally, to a communication system architecture and operating protocol therefor, and is particularly, but not exclusively, applicable to an interface arrangement that integrates a local area network (LAN), typically operating in a wide-band context, with a broadband virtual circuit-switched system, such as envisaged and implemented in Asynchronous Transmission Mode (ATM) networks.

SUMMARY OF THE PRIOR ART

Telephony systems have evolved from simplistic hard-wired interconnected networks to broadband, high capacity systems that support multimedia, multi-mode communication devices on local area networks (LANS) and packet-switched communication systems. Indeed, instead of having to rely entirely on dedicated land-line infrastructure, present day technologies now occupy virtual channel environments in both the radio frequency and land-line domains.

The designers of today's narrowband communication systems, which typically employ pulse code modulation at a data rate of 64 kilo-bits per second (kbps), are presently considering the adaptation and development of these narrowband communication systems to support a migration to a multimedia environment having data rates of two (2) Mega-bits per second (Mbps) and beyond. As will be understood, the requirement for migration arises as a direct consequence of the vast costs involved in deploying global communication systems, with ATM being touted as providing a low cost and simple package that is capable of supporting migration from narrowband (or wide-band) to broadband applications (principally in the intervening period before the full deployment of a free-standing Universal Mobile Telecommunication System (UMTS), for example).

It has also been necessary for designers to consider and anticipate the extensive and elaborate requirements for future control signalling and call management techniques. In this respect, new signalling schemes, such as AAL-2 negotiation procedures, have been developed to provide robust, high bandwidth communications at high data rates, while designers have also been keen to define system architectures in terms of "stacks" that comprise discrete layers of infrastructure or signalling protocols that each add functionality, capacity or control over a preceding layer in the stack.

The problems faced by system designers are further exacerbated by the fact that, to date, the various different forms of communication system, e.g. ATM, LANs and cellular radiotelephone schemes, operate distinct signalling and transport protocols that are incompatible on a network-to-network basis.

GB-A-2311690 describes the merging of two networks in which a telephone subsystem is connected to a packet-switched broadband backbone and in which telephony is added to the backbone without interfering with packetised data. GB-A-2309362 is a mechanism for interconnecting broadband and narrowband networks and is generally related to the present field of the present invention.

WO 96/06492 is an arrangement for supplying local network emulation service over a public connectionless ATM network. More specifically, a server acts as an address resolver and as a relay for routing traffic. SynOptics U.S. Pat. No. 5,420,858 describes the segmentation and re-assembly of information between non-ATM messages and ATM cells.

U.S. Pat. No. 5528590 describes the transfer of data between an ATM-UNI interface and an ATM-LAN interface in a manner such that the ATM-UNI interface recognises frames and assembles and ATM cells into these frames. More particularly, the system can determine whether or not there is enough capacity on the LAN interface for the frame, and only if there is enough capacity is the frame transferred via a ATM switch to the ATM-LAN interface and then onwards to the LAN.

It is therefore clearly desirable to design and produce a communication system architecture that supports varying types of present-day communication network, with the communication system architecture at least possessing an interface that has the capability of handling broadband signalling and transport schemes and which also contemplates the interconnection of LAN or WAN architectures to such broadband networks.

SUMMARY OF THE INVENTION

In a first aspect of the present invention there is provided a method of connecting a first network to a second network via an intermediate network, the first network and second network using a set of control messages to control media paths between the first network and the second network, the method comprising the steps of: establishing a control channel across the intermediate network to carry the set of control messages; intercepting the set of control messages in the intermediate network and determining a requirement for media paths in response thereto; in response to the determination, setting up media paths in the intermediate network to connect paths to carry media traffic between the first network and the second network.

In another aspect of the present invention there is provided a method of connecting communication traffic comprised of a plurality traffic components across a broadband network from a local area network, the method comprising the steps of: in the local area network, generating control messages for controlling the traffic components and applying these control messages to an interface of the broadband network; establishing a communication path within the broadband network to carry at least one of the plurality of traffic components; and in the broadband network, using the control messages to control transfer of the plurality of traffic components over the communication path.

In another aspect of the present invention there is provided a method of interconnecting communication traffic across a broadband network from a local area network (LAN), the broadband network having a transfer protocol that supports mini-channels in a virtual circuit-switched environment, the LAN (10) providing the communication traffic as LAN streams to an interface of the broadband network, the method comprising the step of mapping the LAN streams to the mini-channels.

In a preferred embodiment, the LAN streams include audio, video, data and control streams, and the method further comprising the step of interpreting the control streams to set-up mini-channels used to carry at least one of an audio, video and a data communication.

In yet another aspect of the present invention there is provided a connection supervisor for orchestrating the communication of traffic components between first and second networks via an intermediate network, the connection supervisor responsive to control messages communicated between the first and second networks, the connection supervisor including: means for setting-up a communication path for carrying the control messages across the intermediate network; means for determining types of control message sent across the communication path; and means for establishing media paths dependent upon types of control message sent across the communication path, the media paths arranged to transfer the traffic components across the intermediate network.

In still yet another aspect of the present invention there is provided a communication node having a gateway that provides an interfaces to a first end-point in a network, the first end-point arranged to initiate a call through the communication node by sending to the gateway a called party number of a second end-point coupled to an exchange and wherein control messages are communicated between the first end-point and the second end-point, the communication node further comprising: a call handler coupled to the gateway and responsive to the called party number, the call handler arranged to select a route to the exchange; and a connection supervisor, coupled to the call handler and operationally responsive thereto, the connection supervisor having: i) means to set-up a control channel that supports transfer of the control messages between the gateway and the exchange in response to the call handler receiving the called party number; ii) means for determining types of control message sent across the control channel; and iii) means for establishing media paths between the gateway and the exchange (118) dependent upon types of control message sent across the control channel, the media paths arranged to transfer traffic components across the communication node.

In a preferred embodiment, the communication node is a broadband network and the control channel and the media paths are virtual channels.

Beneficially, the preferred embodiments of the present invention generally provide an ability of interconnecting a first LAN-compatible system (such as a WAN) through a seamless public or private broadband network (supporting narrowband or broadband telephony) to another LAN-compatible system.

BRIEF DESCRIPTION OF THE DRAWINGS

Exemplary embodiments and aspects of the present invention will now be described with reference to the accompanying drawings, in which.

DETAILED DESCRIPTION OF THE PREFERRED EMBODIMENT

Figure 1:
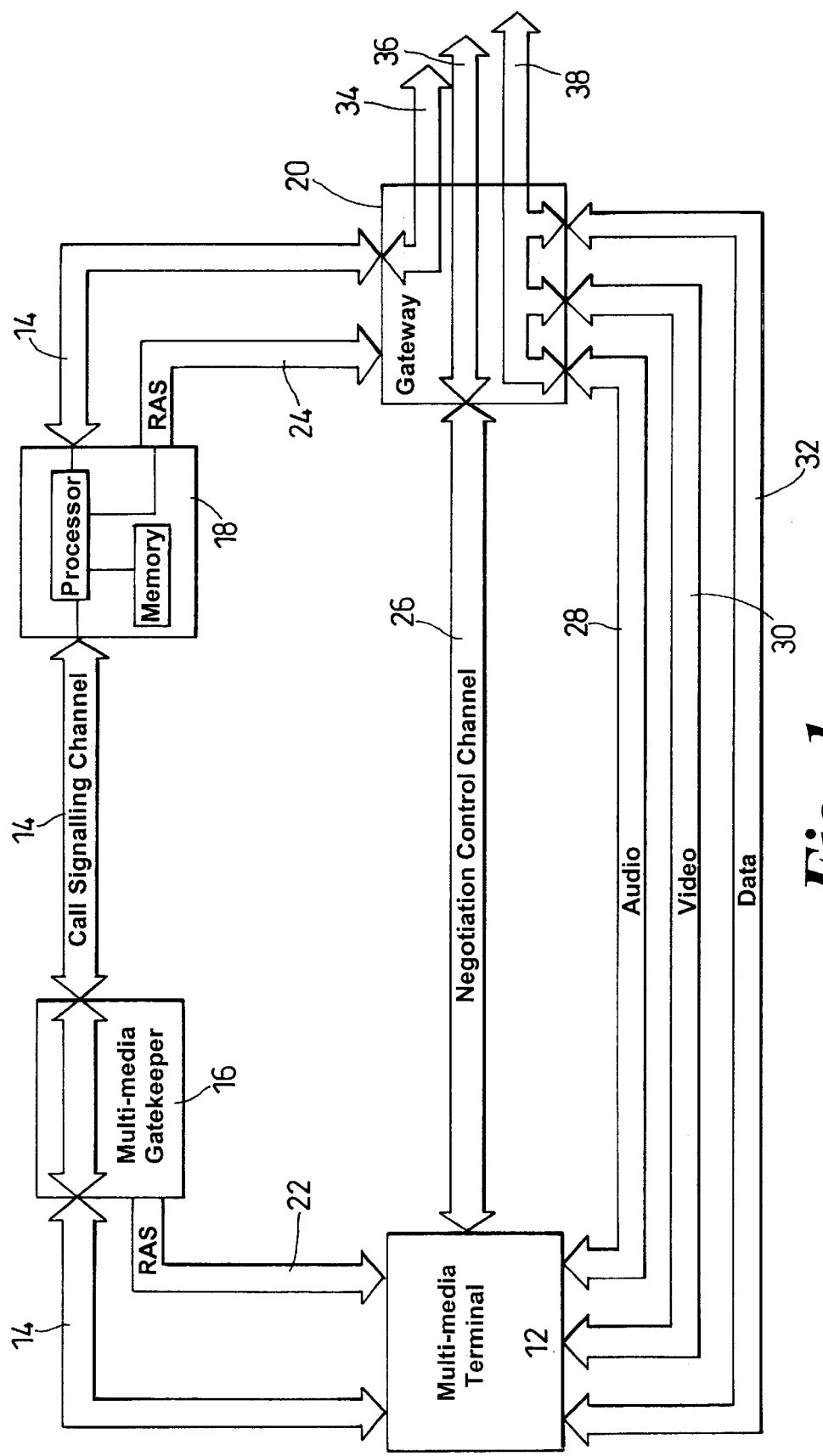
FIG. 1 is a block diagram of a prior art local area network, such as implemented in an H.323 Ethernet architecture.

Referring to FIG. 1, there is shown a block diagram of a prior art local area network (LAN) 10 suitable for supporting an Ethernet connection regime, or the like. The LAN 10, as will be appreciated, operates in a bursty fashion and provides packets of data over an H.323 signalling scheme, or similar messaging protocol. As will be understood, the H.323 signalling scheme defines the functionality of the multimedia terminal 12, the signalling protocols utilised within the LAN 10, the types of terminals suitable for use with the LAN 10 and the transmission protocols adopted for use by the multimedia terminal 12. Although, for the sake of clarity, only a solitary multimedia terminal 12 is shown connected within the LAN 10, it will be appreciated that the LAN 10 can support a multitude of multimedia terminals offering differing levels of functionality to each user thereof.

As will be appreciated, in a LAN environment a limited bandwidth supports numerous packet-based communications that vie for the available bandwidth. When using H.323 protocols over the LAN architecture, port addresses of a first end point are associated with port addresses of a second end point, with the resultant interconnection between pairs of port addresses referred to (generally) as an H.323 channel. In this context, the term "end point" relates to a terminal, a gatekeeper or a gateway (the functions of which will be described later). Each H.323 video or audio channel can be a wideband channel presently supporting data up to a rate of 2 Mbps.

As will be understood, the multimedia terminal 12 and the multimedia gateway 20 each have unique port addresses through which communication (interconnection) is established. Each port address is typically comprised of the LAN address and a port number, with the LAN address usually common to a specific piece of equipment (i.e. the gateway 20 or a multimedia terminal).

A dedicated call signalling channel 14 couples the multimedia terminal 12 to a first multimedia gatekeeper 16, which first multimedia gatekeeper 16 is, in turn, coupled to a second multimedia gatekeeper 18 through the call signalling channel 14. The second multimedia gatekeeper 18 is further coupled to a multimedia gateway 20 (or "multimedia termination point", such as a printer) through the call signalling channel 14. Both the first multimedia gatekeeper 16 and the second multimedia gatekeeper 18 are, respectively, coupled to the multimedia terminal 12 and the multimedia gateway 20 via a registration, admission and status (RAS) channel 22–24. The call signalling channel uses the H.323 signalling protocol. In the context of the prior art, the use of either or both gatekeepers is optional and is included for a more complete understanding of a set-up of a H.323 call.

The function of the multimedia gatekeeper, as will be appreciated, is principally to translate LAN addresses into appropriate network addresses, and to negotiate and control bandwidth requirements for a proposed H.323 communication. Specifically, in response to the multimedia terminal 12 generating an alias network address (i.e. not a LAN address, but something like an e-mail address), the gatekeeper operates to translate the alias address into a usable network or LAN address. More particularly, a processor in the gatekeeper will typically access a look-up table (shown only in relation to the second gatekeeper 18 for clarity) to ascertain the usable network or LAN address, whereafter the gatekeeper updates the multimedia terminal 12 with the usable network or LAN address via the RAS 22. The network address is analogous to a telephone number in a conventional telephone system, although the network address may be formulated in such a way that it can address multiple terminals simultaneously.

It will be understood that the multimedia gatekeepers 16–18 may be co-located with the multimedia terminal 12 and the multimedia gateway 20, and are illustrated as distinct blocks for the sake of explanation. While the LAN is described as having a multimedia gateway 20 (that provides access to different networks having different signalling protocols via a signalling channel resource 34, a control channel resource 36 and channels 38 that support audio, video and/or data), the gateway 20 could be substituted for a second multimedia terminal or a multi-point control unit (namely a conference bridge).

The LAN 10 operates with three principal signalling schemes for each multimedia call. The purpose and function of these schemes will now be described.

Call signalling information is communicated along the call signalling channel 14 and is arranged, principally, to set-up and clear-down calls. Call signalling information generally includes routing information (e.g. the network or LAN address), acknowledge back signalling, connection request/release instructions and input/output port addresses. Assuming that a suitable network address is eventually output from an end point, e.g. multimedia terminal 12, the network address is passed along the call signalling channel 14 and routed via at least the first multimedia gatekeeper 16 (and probably he second multimedia gatekeeper 18) to a receiving end point, e.g. the multimedia gateway 20. More particularly, the network address is typically encoded in a set-up message, as will readily be appreciated, and also identifies the port for the negotiation control channel 26 that the multimedia terminal 12 intends to use. The set-up message, sent from the multimedia terminal 12, causes the receiving unit (in this example, the gateway 20) to respond by sending a port identification and LAN terminal address over the call signalling channel 14. In this way, the receiving unit (in this case the multimedia gateway 20) identifies to the multimedia terminal 12 which port the receiving unit intends to use for the negotiation control channel 26. As such, both the requesting multimedia terminal 12 and the called party each possess an address of a port to which communications on the LAN 10 are to be directed.

Once an understanding (in terms of port usage) has been established between parties that are to participate in the communication, the call signalling channel 14 is used to administer overall system control, while the negotiation control channel 26 (established between the identified port addresses) is used for two principal purposes. First, the negotiation control channel 26 is used to communicate in-call channel information, such as timing information, channel frequency information, data rates and bandwidth allocations. Secondly, the negotiation control channel 26 is used to identify the port addresses (at all terminals) and to control transmissions on the audio stream 28, video stream 30 and data stream 32. The negotiation control channel 26 may utilise H.245 signalling or the like.

Figure 2:
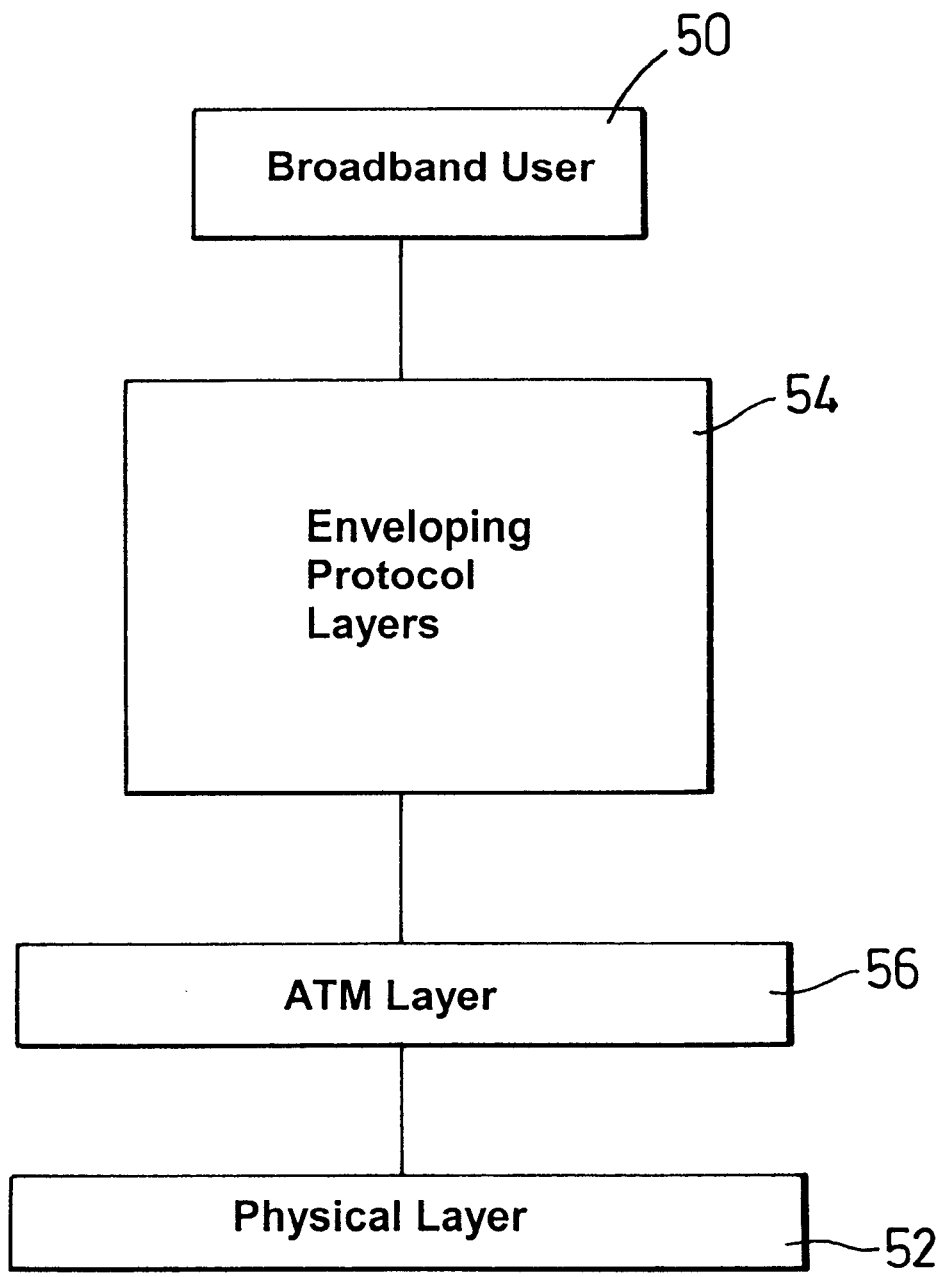
FIG. 2 illustrates the concept of an architectural stack, typically employed within a prior art broadband network.

In an alternative prior art system, namely a broadband network, it will be appreciated that, conceptually, the systems architecture can be considered to comprise discrete architectural layers; this is illustrated in detail in FIG. 2. Specifically, broadband networks, such as those which utilise ATM, are derived from circuit switched telephony and so typically exhibit several intermediate signalling layers between a broadband user 50 and a physical infrastructure layer 52. More particularly, there is usually at least one intermediate enveloping protocol layer 54 juxtaposed to the broadband user 50, while an ATM (packet-switched) signalling protocol layer 56 is sandwiched between the physical infrastructure layer 52 and the enveloping protocol layer 54. Consequently, user information provided by the broadband user 50 is first packaged into defined protocol envelopes (by the enveloping protocol layer 54), which envelopes are then compressed into a packet-switched format by the ATM signalling protocol layer 56. Once fully packaged, information can be transmitted across the broadband network through the physical layer 52.

Therefore, unlike narrowband networks, i.e. circuit-switched communications having a fixed amount of bandwidth per channel, that provide a continuous transmission of information (even in the context of time division multiplexed communication), a broadband network utilises a transfer protocol in which virtual channels are circuit-switched and which provides a provisioned (but varying) bandwidth. Broadband networks can utilise ATM and AAL-2 (ATM Adaptation Layer 2); the latter is a subset of ATM that provides switching at a virtual sub-channel level in an ATM environment. Other protocols used within ATM include AAL-1 and AAL-5. AAL-1 is an ATM adaptation protocol originally targeted at constant bit rate (CBR) traffic, e.g. voice or video, and is applicable to data rates equal to or exceeding sixty-four kbps. AAL-5 provides a capability of data, voice and video transmissions to work stations, and is therefore particularly applicable to multimedia communication systems. AAL-5 segments long data structures into many cells, with a data structure conceivably exceeding fifteen hundred octets in length.

Figure 3:
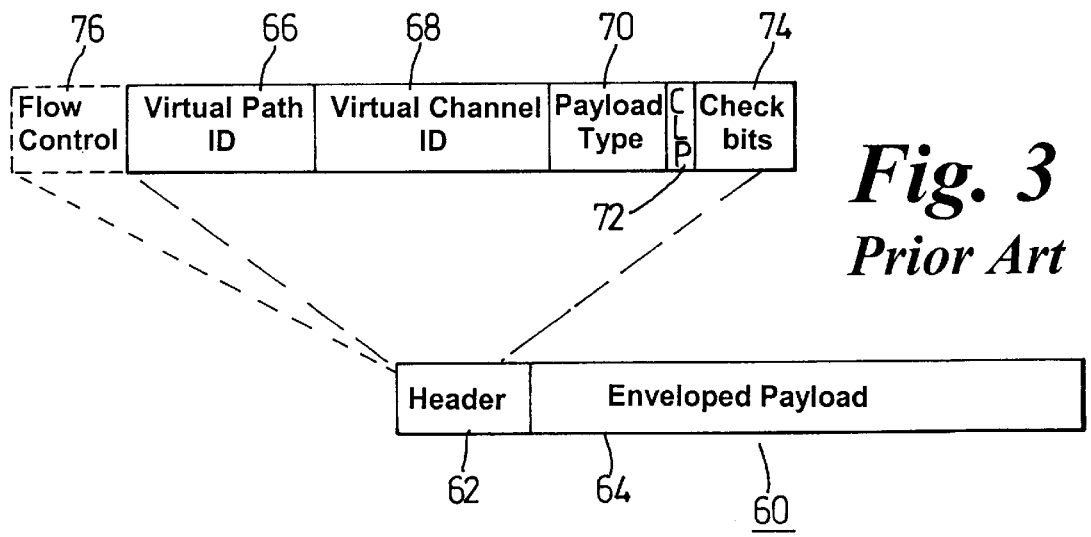
FIG. 3 illustrates a data frame structure for a prior art ATM network.

Turning now to FIG. 3, there is shown basic cell frame structure 60 of a prior art broadband network. For the purpose of explanation, if we now consider the data frame structure 60 as being suitable for ATM transmission, the data frame structure 60 comprises a header 62 of control information and an enveloped payload 64. The header 62 comprises a virtual path identifier 66 and a virtual channel identifier 68 that together co-operate to identify a circuit-switched path (i.e. a virtual channel) through the broadband network. The circuit-switched path is therefore set at the beginning of a call and only released at the end of the call. The header 62 further includes an indication of payload type 70, and an indication termed cell loss priority 72 that stipulates whether the communication on the virtual channel can be dropped to support higher priority communications. As will be appreciated, there is a finite amount of capacity offered by the broadband network and so it may occasionally be necessary to consider the voluntary release of channel resources. Finally, the header 62 includes check-bits for error detection and correction, although the header 62 may optionally include dedicated flow control bits 76 used in quasi-broadband systems to enhance data rate capacity over existing communication resources, e.g. by superimposing high frequency channels over an existing two-wire scheme. More particularly, the generic flow control bits act as negotiation bits and request the assignment of bandwidth, for example, from a system controller (not shown).

Use of this form of packet-switched structure therefore allows interleaving of packets across a shared physical resource, albeit that a virtual channel used for the communication is unique to that communication. The enveloped payload 64, which is of fixed length, will now be described in more detail in relation to FIG. 4 in which there is shown a typical mechanism by which data is "nested" within the payload envelope 64 of FIG. 3. Particularly, data that is ultimately to be nested within the payload envelope 64 can vary in length, and can be comprised from distinct data portions. Indeed, a combination of the individual data portions can produce a data string having an overall length that exceeds the length of the payload envelope 64. Consequently, the data may be encoded using known techniques so as to optimise nesting of the data into the payload envelope 64.

In relation to an AAL-2 protocol data unit (PDU) 80, data 82 is preceded by a start-field octet 84 comprising an offset field 86, a sequence number 88 and parity bit 90. Alternatively, with respect to an AAL-2 service data unit (SDU) 92, the data 82 (which, in this instance, usually varies in length) is preceded by a packet header 94 comprising a channel identifier 96, a length indicator 98, a user-to-user indication 100 and check bits 102. The channel identifier 96 identifies a "mini-channel" that uniquely supports a solitary communication. As such, more than one mini-channel can be nested or interleaved within a single enveloped ATM cell payload 64 of FIG. 3. The length indicator 98 identifies the length of the data portion. The functions of the constituent parts of the packet header 94 are detailed in ITU standards document 1.363.2

Figure 4:
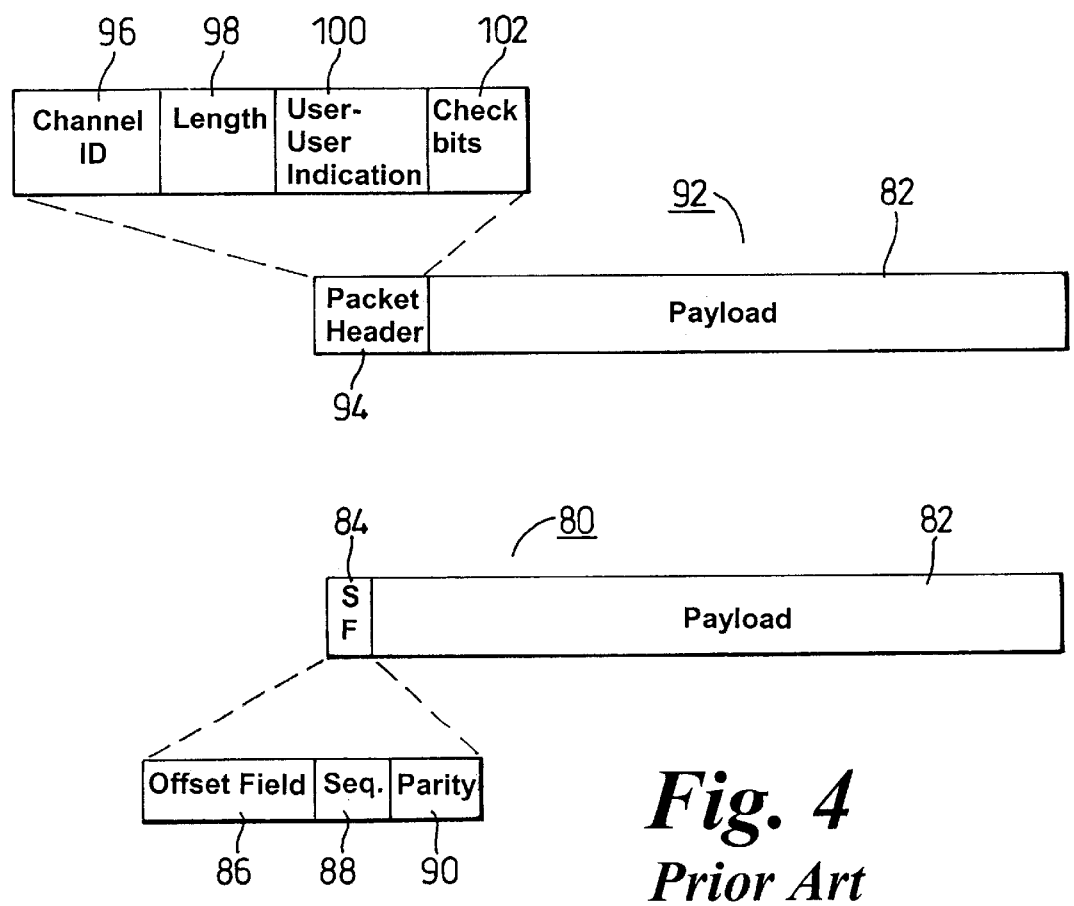
FIG. 4 illustrates a typical frame arrangement used for enveloping data into the data frame structure of FIG. 3.

As will now be appreciated, the exemplary combination of FIG. 3 and FIG. 4 demonstrate the stack concept illustrated in FIG. 2. The PDU and SDU layers for AAL-1 and AAL-5 vary from the structure of AAL-2, but both form stacks within ATM in a similar fashion to that described above, as will be readily appreciated.

Figure 5:
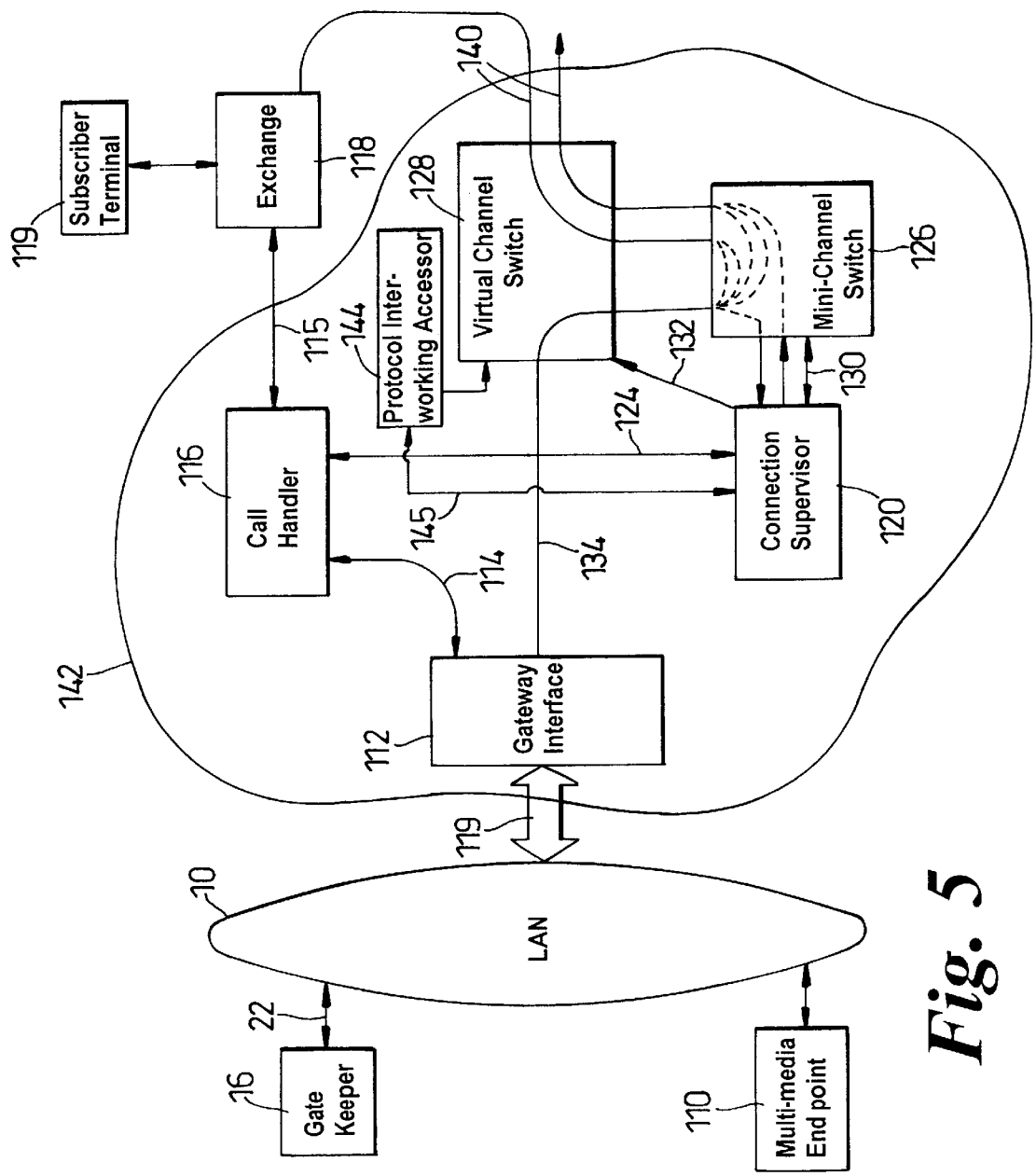
FIG. 5 is a block diagram of an integrated system architecture, according to a preferred embodiment of the present invention, for an interconnected broadband-LAN environment.

Referring now to FIG. 5, a preferred embodiment of the present invention is shown. The present invention provides a mechanism for the interconnection of a LAN to a broadband network, perhaps implemented using ATM. In relation to the figure, elements common with the prior art contain identical reference numerals to those of the earlier drawing figures.

The LAN 10, as previously described, provides a capability of interconnecting communication devices (i.e. multimedia endpoints 110), such as computers (having Internet capabilities) and multimedia terminals 12 and other multimedia devices. As in a conventional system, the LAN 10 may also support a gatekeeper 16. It will be appreciated that a communication resource 111, coupled to a gateway interface circuit 112, supports the transmission of RAS bits and provides a dedicated call signalling channel, a dedicated negotiation control channel and audio, video and data streams (as previously described and shown in relation to FIG. 2, albeit not specifically shown in this drawing figure).

The gateway interface circuit 112 couples call signalling messages 114 to a call handler 116, typically arranged to support an integrated service digital network (ISDN) methodology (either narrowband, broadband or a hybrid). The call signalling messages 114 are used to set-up and clear-down calls, and are also used to identify multimedia terminal addresses and the like. The call handler 116 is, in turn, coupled to a succession of other exchanges 118 through a semi-permanent call signalling channel 115. At least one subscriber terminal 119 is coupled to each other exchange, with the subscriber terminal 119 having a unique address. The connection supervisor 120 is connected through a control line 124 to the call handler 116.

The connection supervisor 120 is arranged to supervise the control of both a mini-channel switch 126 and a virtual channel switch 128 via control lines 130 and 132, respectively. The virtual channel switch 128 is coupled to the gateway interface 112 via a first virtual channel resource 134 supporting (in the exemplary context of AAL-2) enveloped mini-channel payloads, e.g. H.245 negotiation control messages, and audio, video or data packets. Before providing an output on a second channel resource 140, the virtual channel switch 128 routes the payloads received on the first virtual channel resource 134 through the mini-channel switch 126, which mini-channel switch 126 is arranged to optimise call transmissions ultimately output by the virtual channel switch 128 on the second virtual channel resource 140. The second virtual channel resource 140 leads to the other exchange 118.

The connection supervisor 120 provides a dual function. First, it acts to control the virtual channel switch 128 (via control line 132), and the mini-channel switch 126 (via control line 130). Second, the connection supervisor 120 also functions to receive, process and generate H.245 messages for H.323 calls. In this latter respect, H.245 messages are routed between the first virtual channel resource 134 and the connection supervisor 120 and also between the connection supervisor 120 and the second virtual channel resource 140, with both routings being via the virtual channel switch 128 and the mini-channel switch 126.

The gateway interface 112, the call handler 116, the connection supervisor 120, the virtual channel switch 128 and the mini-channel switch 126 constitute parts of an exchange (or node) 142.

The present invention also has application in relation to AAL-1 and AAL-5, which operational embodiments will be described in more detail later. However, to support hybrid working between AAL-1, AAL-2 and AAL-5 the exchange 142 further includes a protocol interworking processor 144 that translates between AAL-1, AAL-2 and AAL-5. This protocol interworking processor 144 is coupled to the virtual channel switch 128. The protocol interworking processor 144 is operationally responsive to the connection supervisor 120 (via control line 145). One will appreciate that the mini-channel switch 126 is not required in relation to AAL-1 and AAL-5 specific calls. H.245 messages carried on AAL-5 instead of AAL-2 are routed solely through the virtual channel switch and through the connection supervisor; this connection is not shown for the sake of clarity of FIG. 5.

Figure 6:
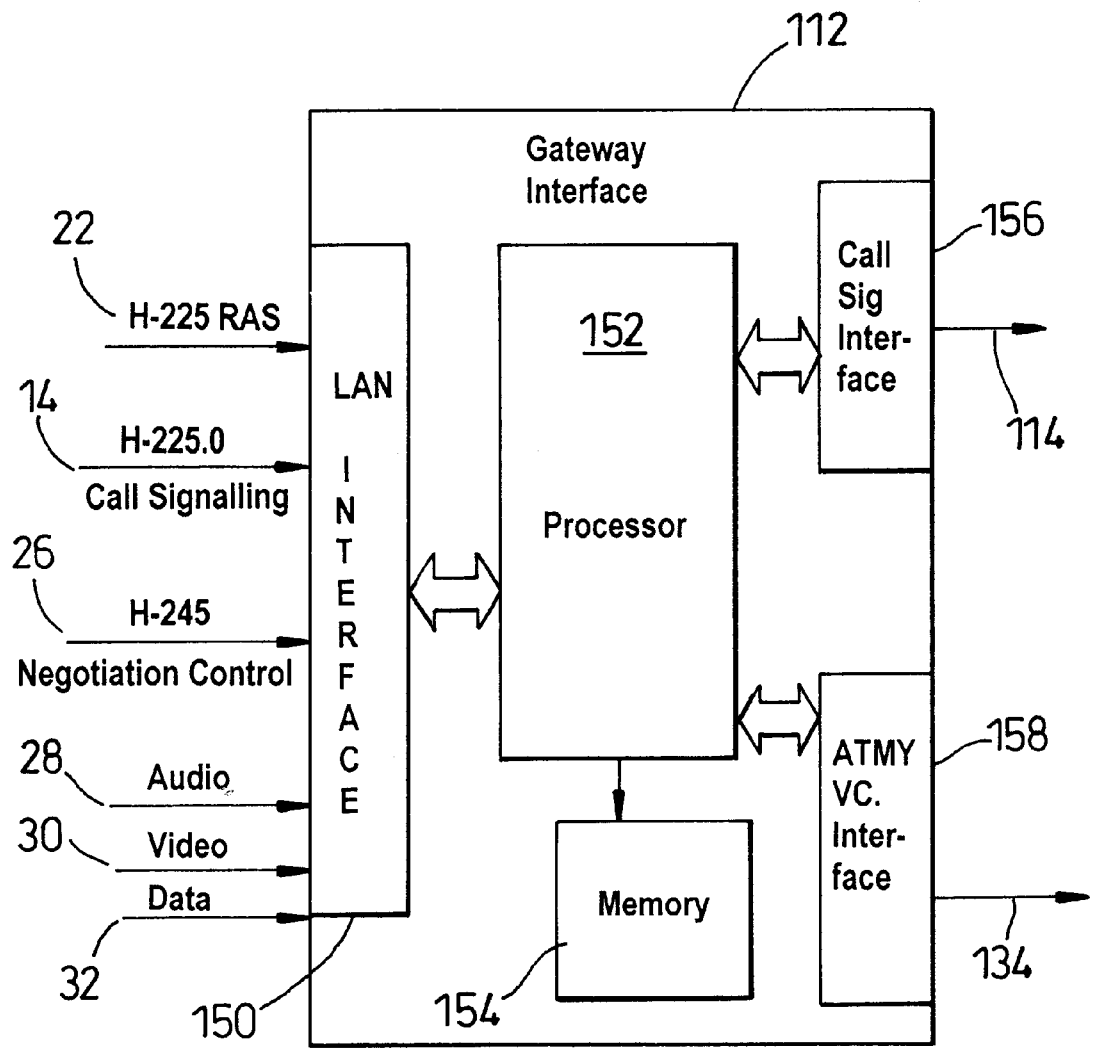
FIG. 6 represents a block diagram of a gateway of FIG. 5, the gateway constructed according to the preferred embodiment of the present invention.

FIG. 6 illustrates the structure of the gateway interface 112 in greater detail and also according to a preferred embodiment of the present invention. The gateway interface 112 is responsive to a LAN 10 and receives, at LAN interface 150, an H.225.0 RAS control channel 22, an H.225.0 call signalling channel 14, an H.245 negotiation control channel 26 and audio streams 28, video streams 30 and data streams 32. A processor 152, coupled to a memory device 154, controls the routing of the various input channels and streams (applied to the LAN interface 150) to appropriate output interfaces.

A call signalling interface 156 receives a translated version of signalling messages received on the H.225 call signalling channel 14, i.e. the processor 152 and memory device 154 co-operate to translate incoming call signalling messages into an acceptable broadband format, such as DSS1/IDSS2, for onward routing (via the control signalling channel 114) to the call handler 116. The processor 152 also packages control messages (received on the negotiation control channel 26) and information (received on the audio, video and data streams 28–32) into a mini-channel format suitable for use in the broadband network. This mini-channel format is output through a broadband ATM/virtual channel interface 158 to the first virtual channel resource 134.

As will now be appreciated, the memory device 154 acts as a storage medium for temporarily storing information passing between the LAN and a broadband network, and also contains look-up tables associated with address and routing information, active call and connection information, and signalling protocol translation schemes used to translate LAN signalling to narrowband/broadband signalling.

Operation of the architecture of the preferred embodiment of the present invention will now be described with particular regard to FIG. 7. In response to receiving conventional LAN streams from the call signalling channel 14 (step 200 of FIG. 7), the gateway interface 112 first converts call signalling information (received on the call signalling channel 14) into an appropriate format, such as DSS1, and forwards this onward to the call handler 116. More particularly, as will now be understood, the call signalling information contains an address of a called party (normally as a telephone number, although an E-mail address can also be used) and an identity (e.g. a telephone number and/or E-mail address) of a requesting multimedia terminal. As such, it might be necessary to translate (at least) the address of the called party into a format acceptable to the broadband network (step 202). In other words, the gateway interface may need to generate a telephone number for use in the broadband network.

This address mapping process can be executed within the call hander 116 or within the gateway interface 112, after which the communication system begins to establish a connection. As a consequence of this procedure, data received by the gateway interface 112 (by way of the audio, video and data streams 28–32 and the negotiation control channel 26) will typically need to be stored, temporarily, in memory 154. As will be appreciated, in a multimedia call, the LAN streams can be considered as forming distinct traffic components in the call.

Using the telephone number of the called party, the call handler selects an outgoing route, i.e. the next exchange 118, and a trunk circuit leading to that next exchange (step 204). The connection supervisor 120 is then notified of the selected trunk circuit. Optionally, the call handler can send an SS7 IAM to the next exchange 118 (via the call signalling channel 115), but there is an associated risk because, at this time, there is no guarantee that a successful path can be set up across exchange 142. In the event that an IAM is sent, then the relevant next exchange 118 then responds to the call handler 116 and identifies/confirms the address identity or identities that, respectively, has or have been ear-marked for the call; this mechanism is therefore analogous to the prior art procedure described in relation to FIG. 1. The call handler 116 sends the identity of a selected trunk circuit to the connection supervisor 120 which in turn makes the connections across the virtual channel switch 128 and mini-channel switch 126 (as appropriate) to connect the H.245 control channel on the first virtual channel resource 134 to the connection supervisor 120 and then onto the second virtual channel resource 140 (step 206). In this respect, the call handler is under the impression that it is setting up a whole trunk call whereas, in fact, the call handler 116 is only setting up the H.245 negotiation control channel.

As a brief re-cap, the calling party dials the number of the called party and, in response thereto, the call handler 116 analyses the called number and selects out-going route (based on the called number) to next exchange 118. Preferably, the call handler 116 selects a trunk circuit belonging to the out-going route, although this function may be performed by the connection supervisor 120. Rather than asking the virtual channel switch 128 to set-up media paths for the call, the call handler 116 then asks connection supervisor 120 to set-up the call.

Step 206 is now described in more detail. The connection supervisor 120 interacts with the gateway interface 112, the virtual channel switch 128 and the mini-channel switch 126 to orchestrate a broadband connection. A first step requires the selection of a first mini-channel of the first virtual channel resource 134, which mini-channel is incident to the gateway interface 112. Preferably, the connection supervisor 120 makes the selection of the first mini-channel. A first connection is made (through use of control channels 130–132) between the gateway interface 112 and the connection supervisor 120, which connection uses the first mini-channel and is made via the virtual channel switch 128 and the mini-channel switch 126. The connection supervisor then uses the trunk circuit identity (received from the call handler 116) to select a virtual channel and a second mini-channel from the available virtual channels of the second virtual channel resource 140. A second connection is then made between the connection supervisor 120 and the other exchange 118 using the selected virtual channel and the second mini-channel via the virtual channel switch 128 and the mini-channel switch 126. The connection supervisor 120 associates the first mini-channel and the second mini-channel with each other and the H.323 call.

At step 208, the call handler 116 sends a signalling message over the call signalling channel 115 to provide details of the set-up to the next exchange 118. In the preferred embodiment, the signalling message is an SS7 IAM containing the selected trunk circuit identity, the virtual channel identity and the mini-channel identity; the latter two are within the user-to-user field. The call handler 116 should receive from the next exchange 118 a message confirming the trunk circuit identity, etc. However, if an IAM was sent during step 204 (and hence did not include the virtual channel identity and mini-channel identity), then the virtual channel identity and the mini-channel identity must now be sent within a SS7 user-to-user information message.

The initial communication with the next exchange can actually be performed within step 204 or within step 208; the latter is a safer mechanism because the path has been established to the next exchange at this point.

The connection supervisor 120 instructs the gateway interface 112 to launch any previously stored H.245 control messages (received on the negotiation control channel 26) to the first mini-channel that has just been set up. Specifically, the stored control messages are formatted into packets and cells as required by the mini-channels, and then placed on the ATM virtual channel 134 for transmission to the connection supervisor (step 210 of FIG. 7) and then onto the next exchange 118 via the second mini-channel. Furthermore, using H.245, the end points (in this case multimedia terminal 110 and subscriber terminal 119) exchange control messages via the connection supervisor 120 to ascertain a common functional capability regarding audio, video and data.

The call handler 116 is now under the impression that the call set-up has been completed.

The next stage is to set up the required audio, video and/or data paths. Typically (but not necessarily), all mini-channels for the same H.323 call reside within a single virtual channel. In relation to each required path, the following applies.

In step 212, the calling unit that initiated the call set-up (i.e. the multimedia end point 110 in this example) now sends an H.245 control message to the exchange 142, which message is actually relayed to the connection supervisor 120. The connection supervisor 120 assimilates the information contained in the H.245 control message and sets up a path between the gateway interface 112 and the next exchange 118. To accomplish such a path, the connection supervisor 120 selects: i) a third mini-channel of the first virtual channel resource 134; and ii) a fourth mini-channel of the second virtual channel resource 140. The connection supervisor 120 then connects the third min-channel and the fourth mini-channel together via the virtual channel switch 128 and the mini-channel switch 126. The connection supervisor 120 generates relevant H.245 control messages and sends them to the next exchange 118. Upon receipt of H.245 control messages from the next exchange 118, the connection supervisor 120 sends the corresponding H.245 control messages back to the gateway interface 112 for transmission back to the multimedia end-point 110.

The process described above must be repeated for every audio, video or data path required.

The gateway interface 112 now operates to encode any stored traffic (obtained from the audio, video and data streams) into mini-channels that are then communicated to the next exchange 118 and ultimately (in an appropriate form) to the subscriber terminal 119. As will be understood, the initiating end-point may start to transmit information before the exchange 142 (as a whole) is quite ready. Therefore, buffering is usually provided within the gateway interface 112.

Figure 7:
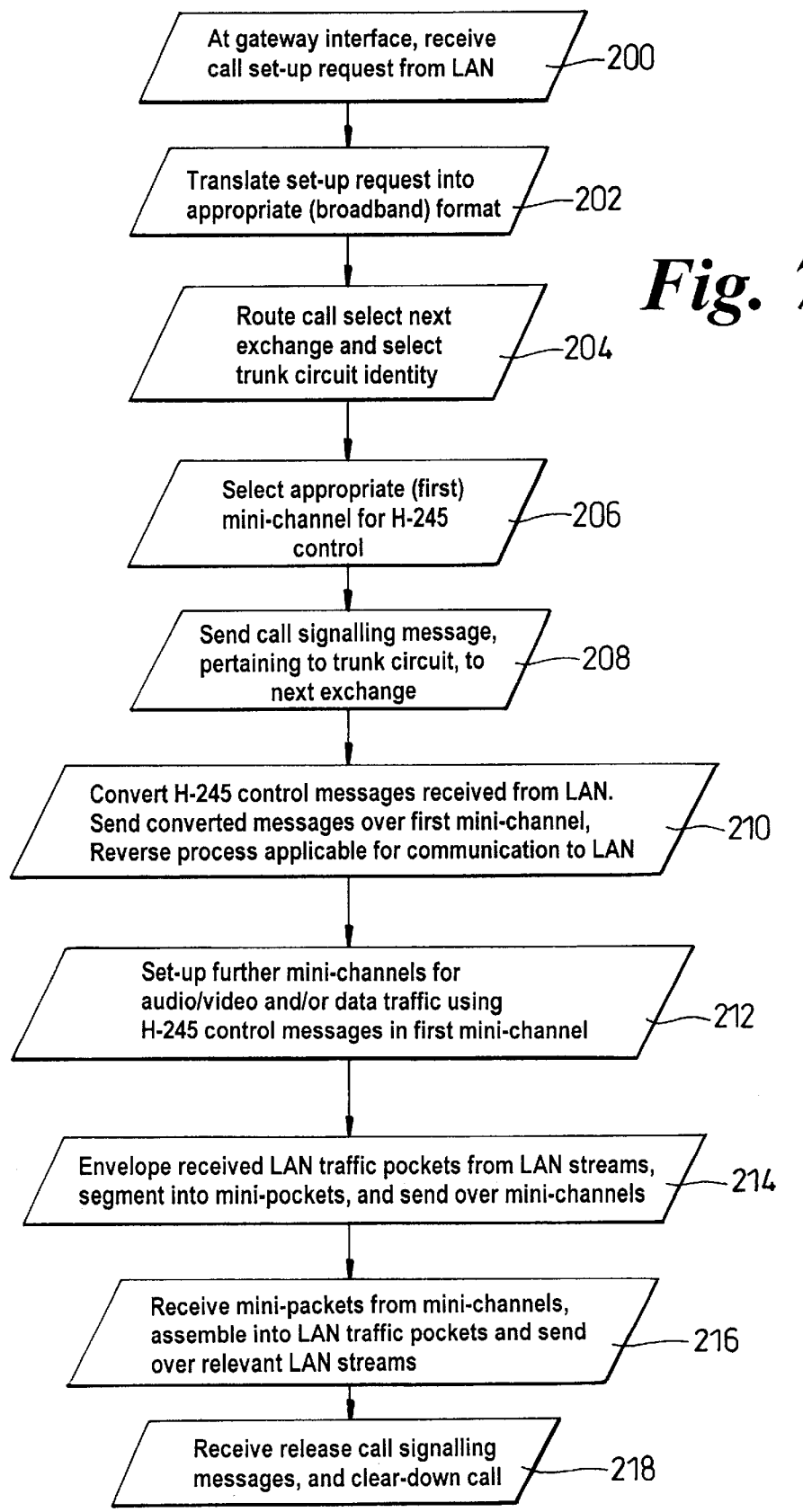
FIG. 7 is a flow diagram illustrating how, in accordance with a preferred method of the present invention, call set-up is established within the system of FIG. 5.

At step 214 of FIG. 7, audio, video and/or data transmission can now occur over the assigned mini-channels set up for these purposes. In relation to the LAN streams, LAN traffic packets from the respective streams must be segmented (i.e. sized and labelled with a header) into mini-packets (e.g. AAL-2 packets). In the reverse direction, mini-packets are re-assembled to form LAN packets for the respective LAN streams (step 216).

The set-up of the H.323 call is now complete.

There are numerous ways of clearing down the H.323 call. It is possible to have a partial clear-down in which audio, video or data paths are individually cleared down. To do this, an H245 control message is sent to the connection supervisor 120 that reacts by clearing down the relevant mini-channels. Alternatively, the whole call can be released by sending a release message over the call signalling channel 114 or 115 to the call handler 116. The call handler is unable to clear down the call itself and must therefore solicit the assistance of the connection supervisor 120 to clear down all mini-channels related to the H.323 call. The mechanism is, however, dependent upon the direction from which clear down is initiated. Specifically, different signalling systems exist between: the call handler 116 and the gateway interface (e.g. DSS1 or DSS2); and the call handler 116 and the next exchange 118 (e.g. signalling system no. 7 (SS7)).

In relation to the operation of the mini-channel switch 126, the connection supervisor 120 is responsible for associating the input and output ports of the mini-channel switch 126 and therefore accordingly notifies the mini-channel switch 126.

To describe the invention is a different but complementary way, one can consider the following. Call signalling is used to set-up and clear-down an H.245 control channel applied to the gateway interface 112. On the LAN 10, call signalling is achieved using H.323 (H.225) call signalling messages; while DSS1/DSS2 signalling messages are utilised in the narrowband/broadband access network, and SS7 N-ISUP/B-ISUP signalling messages are used for call signalling in the narrowband/broadband trunk network. On the LAN 10, routing of the H.323 call can be based upon transport addresses, telephone numbers (as per E-164) or E-mail addresses, while the call handler 116 bases its routing upon telephone numbers. Also, on the LAN 10 and where appropriate, the relevant infrastructure and subscriber entities know the transport address of each end of the H.245 control channel, whereas a relevant call handler in the access network knows the access circuit identity for the H.323 call. In the trunk network, the relevant call handler knows the trunk circuit identity used for the H.323 call.

In other words, the call handler 116 has been hood-winked in the present invention into believing that the gateway interface 112 is a subscriber and hence operating within its access network. The call handler 116 believes that the next exchange 118 is connected to its trunk network (either narrowband or broadband).

When the call handler 116 sets up an H.323 call, the call handler 116 believes that the whole call has been established while, in fact, only the H.245 control channel has been set up. In the system of the present invention, no call handler or call signalling message knows the identity of any audio, video or data channel.

An outgoing call from the LAN 10 will be established on the following basis. The first significant event occurs when the call handler 116 receives a DSS1/DDS2 set-up message from the gateway interface 112. In response thereto, the call handler 116 performs digit analysis (of the called telephone number) and then selects an outgoing route (and hence a next exchange) while also selecting a trunk circuit within the outgoing route. The outgoing route must be selected before any inter-exchange virtual channel can be selected. The connection supervisor 120 obtains the outgoing trunk circuit identity from the call handler 116 and then selects and sets up associated virtual channels and mini-channels on which control messages will be sent and received.

In relation to the bandwidth of an outgoing call, a bearer capability field in the H.323 call signalling set-up message, received from the LAN 10, indicates the required bandwidth for the call. This bandwidth indication is then used by the connection supervisor 120 to select a virtual channel of appropriate bandwidth between the gateway interface 112 and the virtual channel switch 128. Usually, subsequent virtual channels used for the H.323 call will have the same bandwidth.

For an incoming call, the call handler 116 receives, from an interconnected exchange 118, an SS7 N-ISUP/B-ISUP IAM message on the call signalling channel 115. This message contains a trunk circuit identity associated with an H.245 control mini-channel. The IAM message also includes, within its user-to-user field, an indication of which mini-channel in which incoming virtual channel (used to relay H.245 control messages) corresponds to the above mentioned trunk circuit identity; this indication is utilised by the connection supervisor 120 to identify the appropriate virtual channels and mini-channels. The call handler 116 asks the connection supervisor 120 to set up a single 64 kbps circuit (in the narrowband case), i.e. the circuit required for use as the H.245 control channel. Note that, in a preferred embodiment, the connection supervisor is arranged to set up an appropriate virtual channel and mini-channel leading to the gateway interface 112, rather than a 64 kbps circuit. In relation to bandwidth allocation for an incoming call, the true required bandwidth will be obtained from the user-to-user field of the IAM message. The connection supervisor then uses this bandwidth to set-up the appropriate virtual channel.

In relation to point-to-multi-point communication (which is supported by H.323), the connection supervisor 120 is arranged to consolidate separate calls (that would otherwise be supported on separate and distinct virtual channels) through a conference bridge connected to the mini-channel switch 126.

In summary, therefore, once the relevant end-point (or terminal) identities (e.g. telephone numbers, E-mail addresses, etc.) and address identities (e.g. trunk circuit identity and virtual channel plus mini-channel identities) have been exchanged between the gateway interface 112 and the exchange 118, a first AAL-2 mini-channel is used as a control (signalling) channel, and this first mini-channel then controls the setting up and clearing down of other AAL-2 mini-channels which support the same H.323 multimedia call between the multimedia endpoint 110 (of the LAN 10) and the subscriber terminal 119. In other words, H.323 LAN streams are converted into AAL-2 mini-channels by the gateway interface 112, and then carried on a virtual channel which is itself controlled by an AAL-2 mini-channel using encoded H.245 control messages.

Basically, the present invention uses control messages specific to a first type of network in a different context within an intermediate network (i.e. a broadband network) such as to set-up requisite media paths in the intermediate network, whereas the prior art uses a gateway at each boundary to the intermediate network to convert entirely all control messages and media formats for transport across the intermediate network.

Rather than having the system of the present invention establish a trunk connection between the LAN and the called subscriber's exchange, the preferred embodiment of the present invention establishes AAL-2 mini-channels.

In relation to the application of the set-up procedure of the preferred embodiment, this set-up procedure is equally applicable, for example, to situations where AAL-5 is used instead of AAL-2, or to where a mixture of AAL-1, AAL-5 and AAL-2 are used instead of just AAL-2. It will be appreciated that the various ATM adaptation layers are geared towards optimal transport of different types of information and that, as such, AAL-2 is more efficient in relation to voice communication as compared with AAL-5 that is optimal for long data messages. Again, the call handler 116 is under the impression that it has set-up a call between the gateway interface 112 and the next exchange 118, although in practice the call handler has, in fact, delegated the set-up to the connection supervisor which actually merely sets up the H.245 control channel. This H.245 control channel could be an AAL-5 virtual channel, an AAL-2 sub-channel within a virtual channel, or a functional equivalent. The H.245 control channel is now used to set-up the actual paths for the audio, video or data communication. These actual audio, video or data paths can use either AAL-1, AAL-2 or AAL-5. In other respects, the call set-up procedure is unaltered at a functional level, although minor and readily appreciated changes will be required to the hardware within, for example, the gateway interface 112.

The present invention therefore advantageously provides a mechanism for interconnecting a LAN to a broadband/mini-channel network, while ostensibly maintaining conventional H.323 calls across the system. More particularly, the present invention provides an integrated architecture having increased functionality, with this accomplished without the need for significant changes in the signalling protocols of either system, other than in relation to address and port information that potentially needs to be transposed to provide inter-network addresses.

We claim:

1. A method of connecting a first network to a second network via an intermediate network, the first network and second network using a set of control messages to control media paths between the first network and the second network, the method comprising:

using a call handler independent of a switch to establish a control channel across the intermediate network to carry the set of control messages;

at a connection supervisor coupled to the switch and responsive to the call handler, intercepting the set of control messages in the intermediate network and determining a requirement for media paths, based on an interpretation of the types of intercepted control messages, in response thereto;

in response to the determination, having the connection supervisor set up media paths in the intermediate network to connect paths to carry media traffic between the first network and the second network.

2. The method of connecting according to claim 1, wherein the set of control messages are communicated on an end-to-end basis.

3. The method of connecting according to claim 1, wherein intercepting the control messages further includes the step of identifying the type of communication required in the media paths.

4. The method of connecting according to claim 3, wherein the intermediate network is a broadband network.

5. The method of connecting according to claim 1, wherein the control channel and the media paths use AAL-5.

6. The method of connecting according to claim 1, wherein the call handler is responsive to a calling party, the method further comprises the steps of:

having the calling party dial a number of a called party;

analysing the number of the called party in the call handler and selecting an out-going route to the second network based on the number of the called party;

having the call handler instruct the connection supervisor to set-up control channel.

7. The method of connecting according to claim 1, wherein the media paths carry at least one of audio traffic, video traffic and data traffic.

8. The method of connecting according to claim 1, wherein the control messages are H.245 control messages.

9. The method of connecting according to claim 1, wherein the media paths use of one AAL-1, AAL-2 and AAL-5.

10. The method of connecting according to claim 6, further comprising having the connection supervisor indicate to the call handler that the control channel is set-up between a gateway interface and the second network.

11. The method of connecting according to claim 10, wherein the control channel is a virtual path that used one of AAL-2 and AAL-5.

12. A method of connecting a communication traffic comprised of a plurality of traffic components across a broadband network from a local area network, the method comprising:

in the local area network, generating control messages for controlling the traffic components and applying those control messages to the broadband network;

establishing a communication path within the broadband network to carry at least one of the plurality of traffic components, the communication path established using a call handler, independent of a switch, to establish a control channel across the broadband network to carry the control messages and wherein a connection supervisor, coupled to the switch and responsive to the call handler, intercepts the control messages to determine a requirement for media paths, based on an interpretation of the types of intercepted control messages, in response thereto, the connection supervisor setting up media paths in the broadband network to provide the communication path to carry media traffic across the broadband network from the local area network; and in the broadband network, using the control messages to control transfer of the plurality of traffic components over the communication path.

13. The method of connecting according to claim 12, wherein the plurality of traffic components are from the set of video, audio and data traffic.

14. The method of connecting according to claim 12, wherein the communication path is a virtual channel.

15. The method of connecting according to claim 14, wherein the virtual channel comprises a plurality of mini-channels and wherein the control messages are enveloped within at least one mini-channel.

16. The method of connecting communication traffic according to claim 12, further comprising:

at the interface (112), receiving a local area network address and translating (202) said local area network address into a broadband network address.

17. The method of connecting according to claim 12, further including:

in relation to a point-to-multipoint call having a plurality of destination addresses, consolidating traffic components for each of the plurality of destination addresses into a mini-channel.

18. A connection supervisor for orchestrating the communication of traffic components between first and second networks via an intermediate network, the connection supervisor responsive, in use, to control messages communicated between the first and second networks over a control channel established by a call handler, the connection supervisor including:

means for intercepting and determining types of control messages sent across the control channel; and means for establishing media paths dependent upon the determination of types of control messages sent across the control channel, the media paths being arranged to transfer the traffic components across the intermediate network;

wherein said connection supervisor is, in use, responsive to the call handler, the call handler being independent of a switch in the intermediate network and the connection supervisor arranged, in use, to be coupled to the switch.

19. The connection supervisor of claim 18, wherein the intermediate network is a broadband network and the communication path and the media paths are virtual channels.

20. The connection supervisor of claim 18, wherein the media paths carry at least one of audio traffic, video traffic and data traffic.

21. A communication node having a gateway that provides an interface to a first end-point in a network, the first end-point arranged to initiate a call through the communication node by sending to the gateway a called party number of a second end-point coupled to an exchange and wherein control messages are communicated between the first end-point and the second end-point, the communication node further comprising:

a call handler coupled to the gateway and responsive to the called party number, the call handler arranged to select, in response to receipt of the called party number, a control channel that supports transfer of the control messages between the gateway and the exchange, the call handler independent of a switch; and a connection supervisor, coupled to the call handler and connectable to the switch, the connection supervisor operationally responsive to the call handler, the connection supervisor having:

(i) means for determining types of control message sent across the control channel; and (ii) means for establishing media paths between the gateway and the exchange dependent upon the determination of types of control message sent across the control channel, the media paths being arranged to transfer traffic components across the communication node.

22. The communication node of claim 21, wherein the communication node is a broadband network and wherein the control channel and the media paths are virtual channels.

23. The communication node of claim 21, wherein the control messages are H.245 control messages.

24. The communication node of claim 21, wherein the media paths use of one AAL-1, AAL-2 and AAL-5.

* * * * *